(12) United States Patent
Masters et al.

(10) Patent No.: US 6,429,857 B1
(45) Date of Patent: Aug. 6, 2002

(54) APPARATUS AND METHOD TO IMPROVE RESOLUTION OF INFRARED TOUCH SYSTEMS

(75) Inventors: Timothy E. Masters, Georgetown; Robert W. Knetsch, Lexington; Henry A. Grice, Jr.; John Deacon, both of Austin, all of TX (US)

(73) Assignee: ELO Touchsystems, Inc., Fremont, CA (US)

( * ) Notice: Subject to any disclaimer, the term of this patent is extended or adjusted under 35 U.S.C. 154(b) by 0 days.

(21) Appl. No.: 09/728,999

(22) Filed: Dec. 4, 2000

Related U.S. Application Data
(60) Provisional application No. 60/168,509, filed on Dec. 2, 1999.

(51) Int. Cl.[7] .................................................. G09G 5/00
(52) U.S. Cl. ...................... 345/175; 345/173; 178/18.01
(58) Field of Search ................................. 345/175, 173, 345/174, 176, 177, 178; 250/221, 559.19; 346/176; 178/18.01–18.04

(56) References Cited

U.S. PATENT DOCUMENTS

| | | | |
|---|---|---|---|
| 4,301,447 A | 11/1981 | Funk et al. | 340/365 P |
| 4,855,590 A | * 8/1989 | Bures et al. | 250/221 |
| 5,414,413 A | * 5/1995 | Tamaru et al. | 345/175 |
| 5,635,724 A | * 6/1997 | Higgins | 250/559.19 |

FOREIGN PATENT DOCUMENTS

| | | | |
|---|---|---|---|
| EP | 0 601 651 A1 | 6/1994 | G06K/11/08 |
| GB | 2 133 537 A | 7/1984 | G01B/11/14 |
| JP | 11-232024 | 8/1999 | |

* cited by examiner

Primary Examiner—Steven Saras
Assistant Examiner—Christopher J. Maier (57) ABSTRACT

A touch system using a plurality of infrared ("IR") transmitters and receivers, and a method of determining with increased resolution the location of a touch between the IR transmitters and receivers using on-axis and off-axis detection are disclosed. The inventive touch system and method use, in conjunction with the on-axis and off-axis detection, a coarse and fine sweep of the transmitters and receivers to increase the resolution of identified touch location. The method of determining a touch location involves selection and activation of particular off-axis infrared transmitter and receiver pairs determined from a triangulation interdependence between the x and y coordinates. The increased resolution of the identified touch location is achievable using the inventive system and method without the need for an increased number of IR transmitters and receivers and without the need for higher speed processing capability.

11 Claims, 8 Drawing Sheets

APPARATUS AND METHOD TO IMPROVE RESOLUTION OF INFRARED TOUCH SYSTEMS

This application claims benefit of provisional No. 60,168,509 filed Dec. 2, 1999.

This invention generally relates to infrared ("IR") enabled touch systems or touch screens. More particularly, the present invention is directed to an inventive system and method to improve the resolution of IR touch systems. The system and method provide a higher resolution for determining the location of a touch on the screen through the use of on-axis and off-axis IR transmitter-receiver detection. In one embodiment of the inventive method, the touch location is determined by a multiple-step process of first identifying a coarse touch location and then determining a finer location for the touch within the coarse location area. The increased resolution of touch location is achievable with the inventive system and method without the need for an increased density of IR transmitters and receivers or the need for increased processor speed.

BACKGROUND DESCRIPTION

Touch systems are becoming more prevalent in everyday activities. In addition to touch systems being used in money access centers, lobby directories, museum and entertainment kiosks, and automobile positioning system displays, miniaturized touch systems have become the technology medium of choice for pocket diaries and organizers. While IR touch systems may be used in these applications, in order to be successful in these and other emerging markets, the determination of touch location in touch systems, including IR touch systems, must be made quickly, accurately and precisely. This is especially the case for pocket diaries which may use a relatively small point stylus or pointer as the user's means of identifying a desired operation or system selection.

Figure 1:
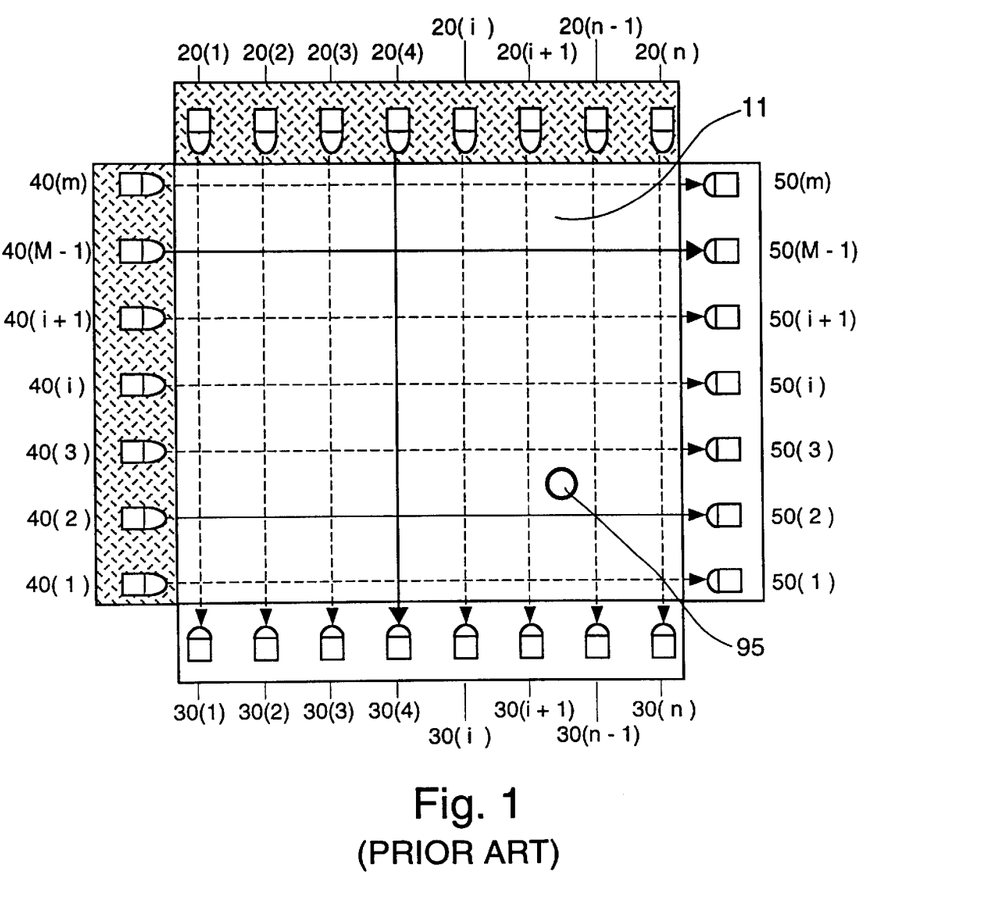
FIG. 1 is an overhead view of an illustration of a conventional prior art touch screen system.

Generally, the location of a touch is identified through use of IR transmitters, typically light emitting diodes ("LEDs"), and IR receivers, typically phototransistors ("photos"). An example illustration of a prior art touch screen is shown in FIG. 1. A set of n IR transmitters 20(1) to 20(n) and another set of m IR transmitters 40(1) to 40(m), for example LEDs, are positioned along two adjacent edges of a touch screen 11. A set of n IR receivers 30(1) to 30(n) and another set of m IR receivers 50(1) to 50(m), are positioned along the opposite edges of the touch screen 11 such that each receiver 30(i) and 50(i) is aligned on-axis with an opposing transmitter, respectively 20(i) and 40(i). As defined, transmitters 20(i) and 40(i) and receivers 30(i) and 50(i) mean each sequential transmitter and receiver where i=1, 2, 3, i, i+1, . . . , n−1, n, for the n transmitters and respective receivers, and where i=1, 2, 3, i, i+1, . . . , m−1, m, for the m transmitters and respective receivers.

In the conventional prior art touch system, the number of transmitters used along the screen perimeter equals the number of receivers positioned along the opposing screen edge, because the transmitters are each aligned on-axis with a receiver. As shown in FIG. 1, the typical touch screen 11 creates a Cartesian coordinate grid of x-coordinate transmitter-receiver pairs, for example x-coordinate pair 20(1) and 30(1), and y-coordinate transmitter-receiver pairs, for example y-coordinate pair 40(3) and 50(3). The detection pattern is accordingly an orthogonal grid of x and y coordinates.

The location of a touch is determined by scanning the x-coordinate pairs and y-coordinate pairs and identifying which transmitter-receiver pairs show a blockage of IR light. The scanning process entails activation of each receiver 30(i) and 50(i) and activating, or flashing, the opposing transmitter respectively 20(i) and 40(i), detecting whether the transmitter 20(i) and 40(i) IR signal is received by the respective on-axis receiver 30(i) or 50(i), and then deactivating each receiver 30(i) and 50(i). This receiver activation, on-axis transmitter flash, receiver deactivation process is repeated for each on-axis transmitter-receiver pair until all transmitter-receiver pairs are scanned.

The accuracy and precision of the location of a touch for a conventional touch system is dependent upon the density or number of transmitters and receivers positioned along the perimeter of the screen 11. One problem with such an orthogonal detection pattern, as illustrated in FIG. 1, is that if a touch diameter 95 is less than the spacing of adjacent transmitters and adjacent receivers, a touch may go undetected as being in an area where no beam crosses.

Moreover, the time period required to make the touch location determination is dependent upon the speed of the processor used to activate and flash the transmitters and receivers, and to detect whether the emitted IR signal is received by the receiver. Obviously, unless the processing capability of the system is increased, as more transmitter-receiver pairs are included in the touch system, the time to identify a touch location will increase along with the time period to scan the complete set of transmitter-receiver pairs.

Because the IR transmitters and receivers, or system optoelectronics, comprise a significant portion of the overall cost of an IR touch system, an increase in the number of optoelectronic devices would result in a dramatic increase in the overall system cost. Similarly, because the processor electronics are another significant portion of the cost of an IR touch system, an increase in processing speed to maintain a maximum time period for touch identification, would likewise cause a substantial increase in the system cost.

In addition to the noted on-axis conventional touch systems, one device described in Japanese Patent Application No. TOKKAI HEI 11-232024 for an Optical Position Detection Device, owned by Alpine Electronics, Inc., provides for the detection of two or more adjacent phototransistors within the range of light emitted from an opposing light emitting diode. The object of the Alpine system is to eliminate the restrictions of the prior art with respect to the number, position and placement of LEDs and phototransistors that would allow for possible improvements in position detection accuracy. While apparently describing detection of LED output through the use of off-axis phototransistors, the Alpine system does not appear to describe or disclose any method for efficiently scanning the LED-phototransistor pairs. Indeed, the device operation description appears to call for the sequential cycling all LEDs and detecting multiple phototransistors for each of the LEDs activated. Such a device would require significantly increased computer processing capability to handle the increased information provided from detecting multiple phototransistors for every LED, and cycling through each LED along the perimeter of the touch screen.

Accordingly, there is a need for a IR touch system that has an improved resolution capability for accurately and precisely identifying the location of a touch, but that does not require significantly more IR transmitters and receivers, and does not require significantly increased computer processing requirements to control the transmitter and receivers and process the data resulting from the scanning operation. Such a system or method does not currently exist, but would greatly extend the utility and capability of IR touch screen systems.

SUMMARY OF THE INVENTION

In view of the shortcomings of the prior art, it is an object of the present invention to provide an improved resolution infrared touch system and method that provides an accurate and precise determination of the location of a touch without increasing the number of touch screen IR transmitters or IR receivers. It is a further object of the present invention that the improved touch position resolution does not necessitate extended or higher speed processing requirements to maintain system resolution and speed of operation.

To achieve this and other objects, and in view of its purposes, the present invention provides an infrared touch system having increased resolution for determining position of a touch on a touch screen, the infrared touch system comprising a first plurality of infrared transmitters positioned along a first edge of the touch screen, each infrared transmitter of the first plurality of infrared transmitters controllably emitting a cone of infrared light; a first plurality of infrared receivers positioned along a second edge of the touch screen directly opposite from the first plurality of transmitters, whereby each receiver of the first plurality of infrared receivers is aligned on-axis with one infrared transmitter of the first plurality of transmitters and is off-axis to each of the other first plurality of transmitters; a second plurality of infrared transmitters positioned along a third edge of the touch screen, the third edge being approximately perpendicular to the first and second edge of the touch screen, each infrared transmitter of the second plurality of infrared transmitters controllably emitting a cone of infrared light; a second plurality of infrared receivers positioned along a fourth edge of the touch screen opposite from the second plurality of transmitters, whereby each receiver of the second plurality of infrared receivers is aligned on-axis with one infrared transmitter of the second plurality of transmitters and is off-axis to each of the other second plurality of transmitters; a processor to control activation of the first and second plurality of infrared transmitters and control activation of the first and second plurality of infrared receivers and for calculating the touch position on the touch screen using on-axis and off-axis activation of the infrared transmitters and receivers.

It is a further object of the present invention to provide an infrared touch system having a touch screen, said infrared touch system comprising a first plurality of infrared transmitters positioned along a first edge of a touch screen, each infrared transmitter of the first plurality of infrared transmitters controllably emitting infrared light; a first plurality of infrared receivers positioned along a second edge of the touch screen opposite from the first plurality of transmitters, whereby each receiver of the first plurality of infrared receivers is aligned on-axis with one infrared transmitter of the first plurality of transmitters and is off-axis to each of the other first plurality of transmitters, further whereby an infrared beam of light emitted from each transmitter of the first plurality of infrared transmitters is receivable by at least two infrared receivers of the first plurality of infrared receivers; a second plurality of infrared transmitters positioned along a third edge of the touch screen, each infrared transmitter of the second plurality of infrared transmitters controllably emitting infrared light; a second plurality of infrared receivers positioned along a fourth edge of the touch screen opposite from the second plurality of transmitters, whereby each receiver of the second plurality of infrared receivers is aligned on-axis with one infrared transmitter of the second plurality of transmitters and is off-axis to each of the other second plurality of transmitters, further whereby an infrared beam of light emitted from each transmitter of the second plurality of infrared transmitters is receivable by at least two infrared receivers of the second plurality of infrared receivers; a first processor to sequentially activate each of the first and second plurality of infrared transmitters and opposing first and second plurality of infrared receivers; and a second processor for calculating a touch position on the touch screen, wherein the second processor identifies a coarse x-coordinate touch area based upon identification of blocked infrared beams between activated transmitters and receivers; identifies a coarse y-coordinate touch area based upon identification of blocked infrared beams between activated transmitters and receivers; calculates a coarse x-coordinate and y-coordinate touch area from the identified coarse x-coordinate and y-coordinate touch areas; and refines the x-coordinate and y-coordinate touch location based upon systematic activation of off-axis transmitter and receiver pairs having infrared beams that cross the calculated coarse touch area.

It is a further object of the present invention to provide a method of determining a touch location on a touch system screen, the screen having along first and second adjacent edges a plurality of infrared transmitters and the touch screen further having a plurality of infrared receivers along third and fourth adjacent edges opposing the plurality of infrared transmitters, such that each transmitter is aligned on-axis to one receiver, the method comprising the steps of estimating a coarse touch location based upon a systematic on-axis activation of each infrared transmitter and opposing receiver; and refining the touch location based upon a systematic off-axis activation of selected infrared transmitters and receivers.

It is a further object of the present invention to provide a method of determining a touch location on a touch system screen, the touch screen having along first and second adjacent edges a plurality of infrared transmitters and the touch screen further having a plurality of infrared receivers along third and fourth adjacent edges opposing the plurality of infrared transmitters, such that each transmitter is aligned on-axis to one receiver, the method comprising the steps of estimating a coarse touch location based upon a systematic on-axis activation of each infrared transmitter and opposing receiver; selecting off-axis transmitter and receiver pairs based upon the coarse touch location estimate; and refining the touch location based upon a systematic activation of the selected off-axis transmitter and receiver pairs.

It is still a further object of the present invention to provide a method of determining a touch location on a touch system screen, the touch screen having along an x-coordinate edge, a first plurality of infrared x-coordinate transmitters and along a y-coordinate edge, a second plurality of y-coordinate infrared transmitters, the touch screen further having a plurality of infrared receivers along two edges opposing the plurality of infrared transmitters, such that each transmitter is aligned on-axis to one receiver, the method comprising the steps of estimating a coarse x-coordinate and y-coordinate touch location on the touch screen based upon systematic on-axis activation of each infrared transmitter and opposing receiver; selecting off-axis transmitter and receiver x-coordinate pairs based upon the coarse y-coordinate touch location estimate; refining the x-coordinate touch location based upon systematic activation of the selected off-axis transmitter and receiver x-coordinate pairs; selecting off-axis transmitter and receiver y-coordinate pairs based upon the coarse x-coordinate touch location estimate; and refining the y-coordinate touch location based upon systematic activation of the selected off-axis transmitter and receiver y-coordinate pairs.

These and other aspects of the present invention are set forth below with reference to the drawings and the detailed description of certain preferred embodiments. It is to be understood that both the foregoing general description and the following detailed description are exemplary, and are not intended to be or should be considered restrictive of the invention.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following Figures.

DETAILED DESCRIPTION OF PREFERRED EMBODIMENTS

The present invention is directed to an infrared ("IR") touch system that provides increased resolution for determining the location of a touch on the touch system screen using both on-axis and off-axis detection. The present invention also is directed to a method for determining the location of a touch on the touch system screen using on-axis and off-axis detection, along with a multi-step coarse scan of the IR transmitter-receiver pairs and a fine scan of selected transmitter-receiver pairs. The inventive method also uses the fact that for a given x or y touch position, the selection of the alternate axis transmitter-receiver pairs to refine the touch location is dependent upon the touch location. In other words, the selection of the y-coordinate transmitter-receiver pairs to refine an x position are determinable from the x coarse position, and the x-coordinate transmitter-receiver pairs are determinable from the y coarse position.

As previously described, the conventional touch system includes, as illustrated in FIG. 1, a touch screen or panel 11, a first set of n IR transmitters 20(1) through 20(n), typically LEDs, positioned along a first edge of the touch screen 11, a first set of n IR receivers 30(1) through 30(n), typically phototransistors, positioned along a second edge of the touch screen 11, a second set of m IR transmitters 40(1) through 40(m) positioned along a third edge of the touch screen 11, and a second set of m IR receivers 50(1) through 50(m) positioned along a fourth edge of the touch screen 11. As shown in FIG. 1, the scan for a touch on the touch screen 11 comprises, using the x direction for example, the activation of a receiver 30(4), flashing the on-axis opposing transmitter 20(4), and then deactivating or turning off the receiver 30(4). This sequence is repeated for each of the transmitter-receiver pairs 20(i)–30(i) along the x direction, and the transmitter-receiver pairs 40(i)–50(i) along the y direction. If a touch exists between a fired x direction transmitter 20(4) and its opposing receiver 30(4), the transmitter 20(4) flash or beam will be blocked and not received by the opposing receiver 30(4), thereby indicating a touch at that x position. Similarly, if a touch exists between a fired y direction transmitter 40(m−1) and its opposing receiver 50(m−1), the transmitter 40(m−1) flash or beam will be blocked and a touch is indicated in that y position.

The coordinates of a touch are calculated using this on-axis detection as the average of the x and y coordinates of the first and last broken beams. In equation form, the x and y touch locations are estimated to be:

$$x_{touch} = (x_i + x_{i+1})/2$$

and $$y_{touch} = (y_i + y_{i+1})/2$$

Accordingly, the possible estimated touch x coordinates are $x_1$, $x_1 + \Delta x/2$, $x_2$, $x_2 + \Delta x/2$, $x_3$, ... $x_i - \Delta x/2$, $x_i$, $x_i + \Delta x/2$, $x_n$, where n is the number of transmitter-receiver pairs along one pair of opposing edges of the touch screen 11. The possible estimated y coordinates would be the same except using the y coordinate positions. From this sequence of potential coordinates, the resolution of determining the touch location is accordingly $\Delta x/2$ and $\Delta y/2$.

Figure 2:
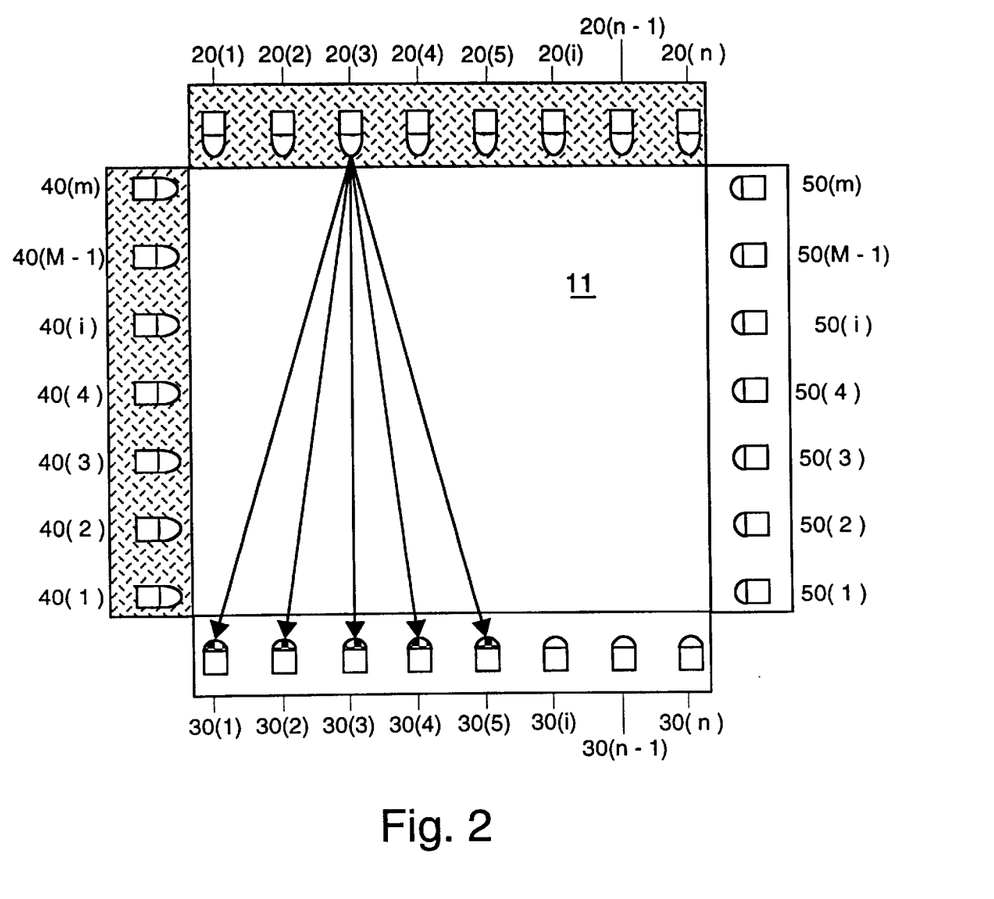
FIG. 2 is an overhead view of an illustration of the present inventive touch system showing an example IR transmitter light cone transmitted to multiple IR receivers.

It is known that the IR light emitted from a transmitter 20(i), 40(i) forms a cone and not a single beam. That is, as shown in FIG. 2, the IR light transmitted from a transmitter 20(3) is capable of being received by a group of adjacent receivers 30(1), 30(2), 30(3), 30(4) and 30(5). Although the FIG. 2 embodiment shows a group of five adjacent receivers capable of detecting an IR transmission from transmitter 20(3), the number of receivers within the cone of IR light is determined by the characteristics of the touch screen system 10. Accordingly, in other preferred embodiments, the number of receivers 30(i) capable of detecting IR light from an IR transmitter 20(i) may be two, three, four or more than five adjacent units. Moreover, although a receiver 30(i) may be within the cone of IR light emitted by a transmitter 20(i), there may not be sufficient IR light at the edges of the cone to be reliably detected, or be detectable by the receiver 30(i).

Accordingly, different IR transmitters may have wider or narrower cones of IR light based upon the specifications of the particular transmitter. One such characteristic of the transmitter, and of the receiver, is the aperture sensitivity of the optoelectronic unit. Moreover, as long as sufficient power is generated by the IR transmitter, and the IR receiver has sufficient sensitivity, the greater the separation between the transmitters and opposing receivers, the greater the number of receivers that will be capable of receiving IR light from a transmitter because the width of the cone expands the further the opposing edge is from the transmitter.

Figure 3:
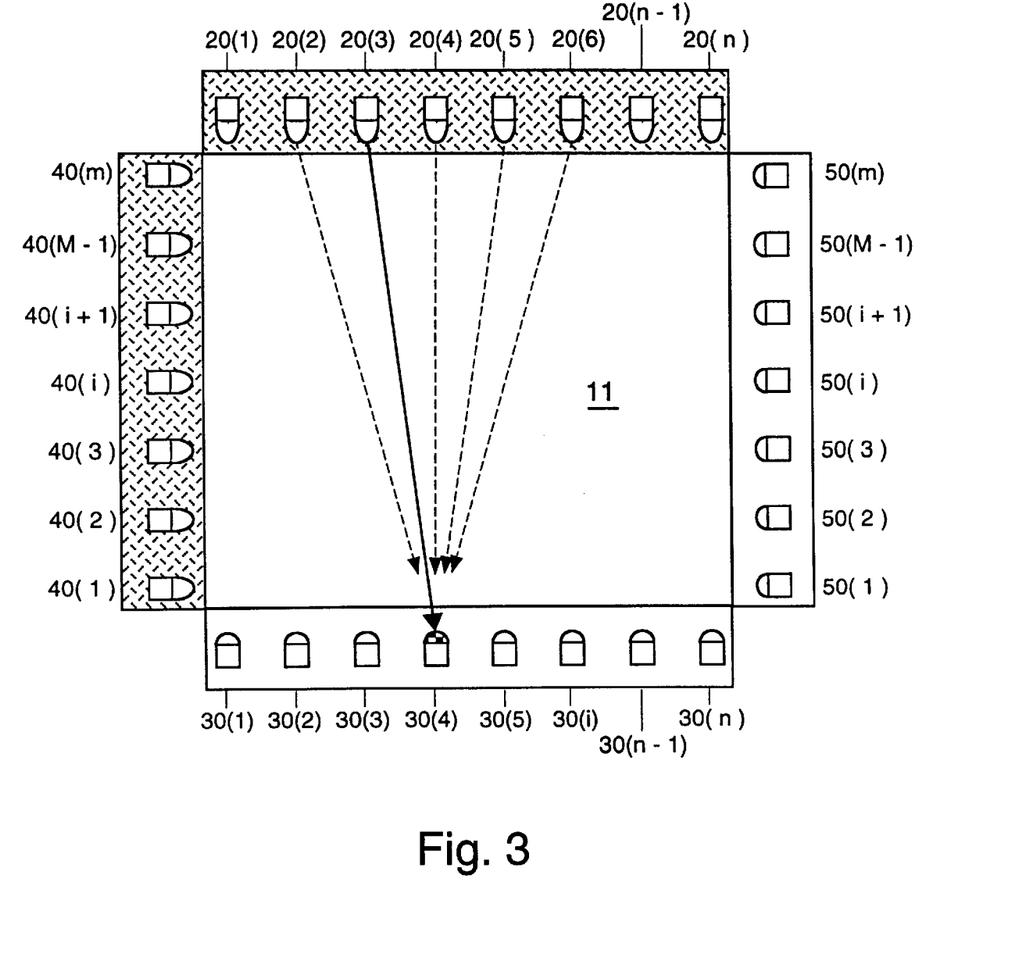
FIG. 3 is an overhead view of an illustration of the present inventive touch system showing an example of a single IR receiver receiving light from multiple IR transmitters.

For the preferred embodiment illustrated in FIG. 2, the receiver 30(3) is on-axis with the transmitter 20(3), and is off-axis with the four receivers 30(1), 30(2), 30(4) and 30(5). Taken from the view of an activated receiver 30(4), as shown in FIG. 3, while the IR beam from an off-axis transmitter 20(3) is detectable by the receiver 30(4), that same receiver 30(4) can also detect an IR transmission from other transmitters, including the on-axis transmitter 20(4) and other off-axis transmitters 20(2), 20(5) and 20(6).

Figure 4:
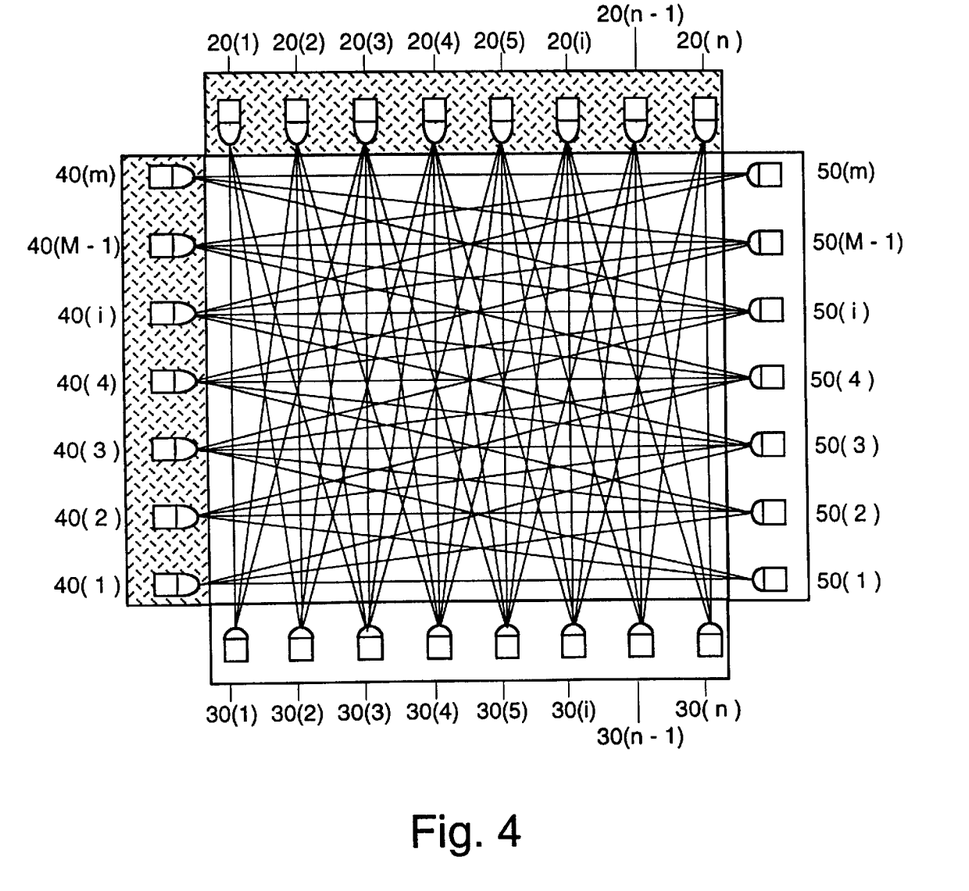
FIG. 4 is an overhead view of an illustration of the present inventive touch system showing an example of the multiple triangulation points available for determining touch location through the use of on-axis and off-axis detection.

FIG. 4 shows the higher resolution potential detection pattern for a preferred embodiment of the present invention. As depicted in FIG. 4, each x and y transmitter 20(i), 40(i) is activated and, using for example, transmitter 20(3), the IR light cone is capable of being detected by its respective on-axis receiver 30(3) in addition to the two off-axis receivers 30(2) and 30(4) being adjacent to the on-axis receiver 30(3), as well as being detected by the next two off-axis receivers 30(1) and 30(5), being adjacent to the two receivers 30(2) and 30(4). In this FIG. 4 preferred embodiment, the off-axis transmitter-receiver pairs used for touch detection are $$i + i \pm 2$$

where i is the position of the on-axis transmitter and receiver. As shown in FIG. 4, the number of potential detection coordinates, or the detection pattern on the touch screen 11, is substantially greater than the number of potential detection coordinates using only on-axis detection as in the FIG. 1 prior art system.

Although the detection pattern for the present invention has a much higher resolution than a conventional on-axis detection, the number of optoelectronic devices used in both systems are the same or substantially the same. From a different perspective, in another preferred embodiment of the present invention, the number of optoelectronic devices required for a touch system may be reduced without sacrificing touch location resolution over the resolution resulting with use of a conventional on-axis detection system.

FIG. 4 also shows that the present invention is capable of sensing a touch having a diameter that is less than the spacing between adjacent optoelectronic devices. This may be compared with the FIG. 1 conventional orthogonal detection grid in which as noted above, if a touch diameter 95, for example a narrow stylus or pointer, is less than the spacing between adjacent transmitters and adjacent receivers, the touch potentially could go undetected.

The FIG. 4 detection pattern shows all potential detection coordinates for an embodiment of the present invention. However, it may not be efficient, or feasible for the touch system processor to scan every transmitter and receiver and maintain a desired system response time. The present invention provides a method of scanning the optoelectronic devices using both an on-axis and off-axis scan, such that the speed and efficiency of locating a touch is significantly improved.

In a preferred embodiment of the present inventive method, a two step scanning operation may be used to quickly identify and refine the location of a touch on the touch screen 11. A first "coarse" scan of the touch screen 11 may be executed by activating and detecting only the on-axis transmitter-receiver pairs. Then, a second "fine" scan of only the area identified by the coarse scan may be completed using both the on-axis and off-axis transmitter receiver pairs.

Figure 5:
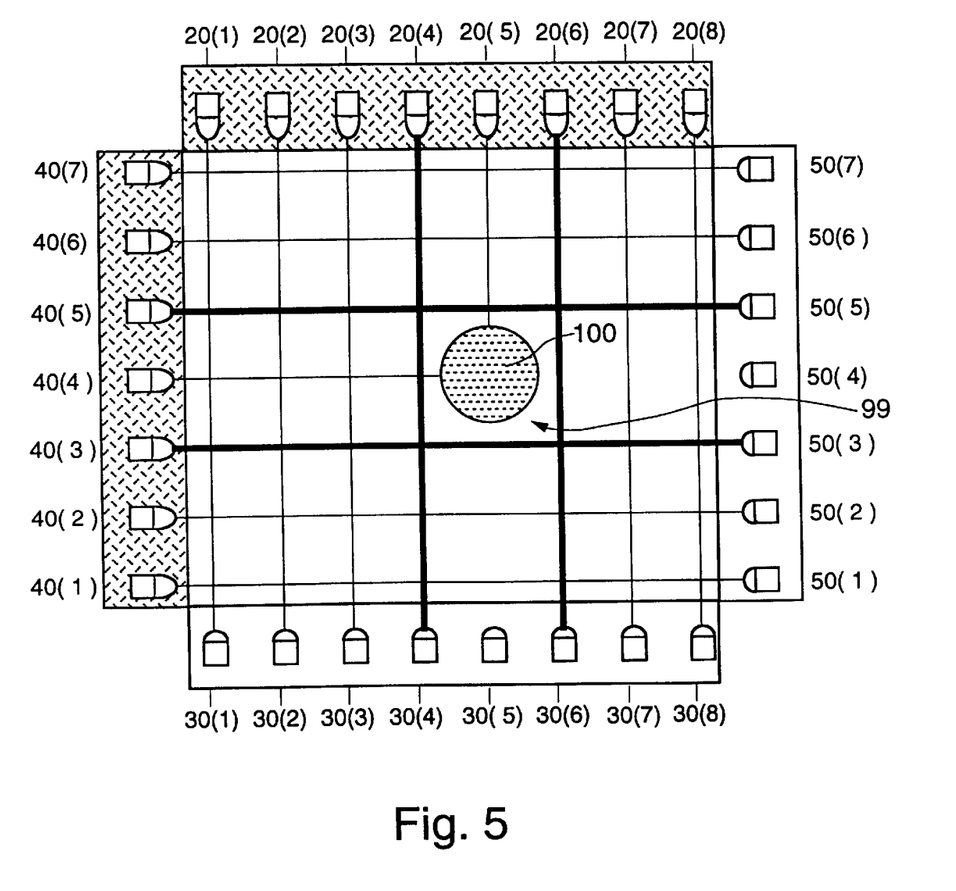
FIG. 5 is an overhead view of an illustration of a step in the present inventive touch system method for improved resolution of touch location showing an example of a first coarse on-axis scan.

By way of example, the first coarse scan of this preferred embodiment of the inventive method is illustrated in FIG. 5. The coarse scan includes the sequential activation of each of the receivers 20(1) through 20(8), and 40(1) through 40(7) along both edges of the touch screen 11 and flashing each of the respectively corresponding on-axis transmitters 30(1) through 30(8), and 50(1) through 50(7). While the FIG. 5 preferred embodiment is shown using 8 x-axis transmitter-receiver pairs and 7 y-axis transmitter-receiver pairs, in other preferred embodiments more or less transmitter-receiver pairs could be used along either the x or y axes.

This step of the inventive method, illustrated in FIG. 5, is similar to a conventional touch system detection previously illustrated in FIG. 1. For the touch 100 shown in FIG. 5, the IR beams from the transmitters 20(5) and 40(4) are blocked and the respective opposing receivers 30(5) and 50(4) accordingly do not detect any on-axis IR beam. As such, the last detected on-axis beams, shown in FIG. 5 by the transmitter-receiver pairs 20(4)–30(4) and 20(6)–30(6), and 40(3)–50(3) and 40(5)–50(5), define a coarse area 99 containing the detected touch.

It is important to note that while the FIG. 5 embodiment shows only an on-axis detection grid, in other preferred embodiments, for example with higher speed processors and electronics, some off-axis transmitter-receiver pairs may be used to refine the coarse scan as long as the overall speed and efficiency of the touch system detection is not degraded.

Figure 6:
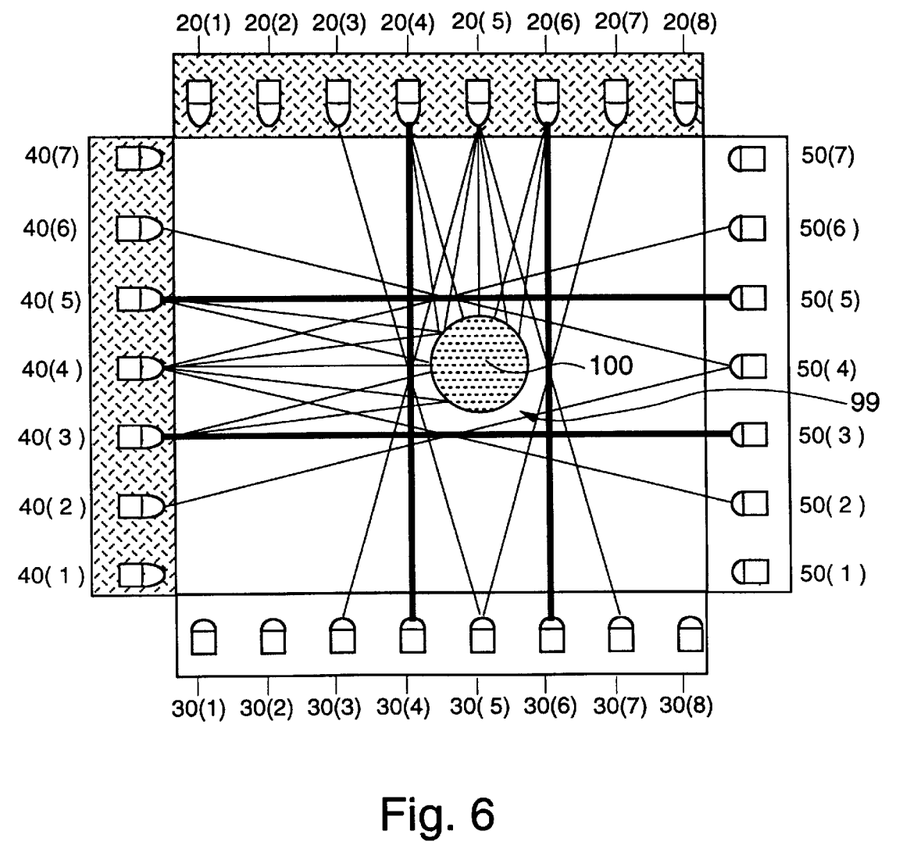
FIG. 6 is an overhead view of an illustration of a step in the present inventive touch system method for improved resolution of touch location showing an example of a second fine on-axis and off-axis scan.

After completing the coarse scan and identifying the coarse touch area 99, a second fine scan of the coarse touch area 99 may be executed using both on-axis and off-axis transmitter-receiver pairs. The off-axis transmitter-receiver pairs activated for the fine scan would, in one preferred embodiment, be those pairs whose IR beam intersects the coarse touch area 99. FIG. 6 illustrates, for a preferred embodiment of the inventive touch system detection method, a detection pattern generated for such a fine scan. The detection pattern shown in FIG. 6 is generated by activating, similar to the FIG. 4 embodiment, the receiver 30(5) that is on-axis with a transmitter 20(5), as well as two receivers 30(4) and 30(6) next to the on-axis receiver 30(5), and the two receivers 30(3) and 30(7) respectively adjacent to receivers 30(4) and 30(6). In other preferred embodiments, the reactivation of the on-axis receiver may be eliminated to reduce the processor detection requirements.

Highlighting the substantial increased resolution available from the off-axis detection method, as shown in FIG. 6, while the coarse scan resulted in two blocked beams, the fine scan resulted in the detection of 14 blocked beams. This additional IR beam blockage information can then be processed to provide a more precise and accurate touch location within the coarse touch area 99.

Figure 8:
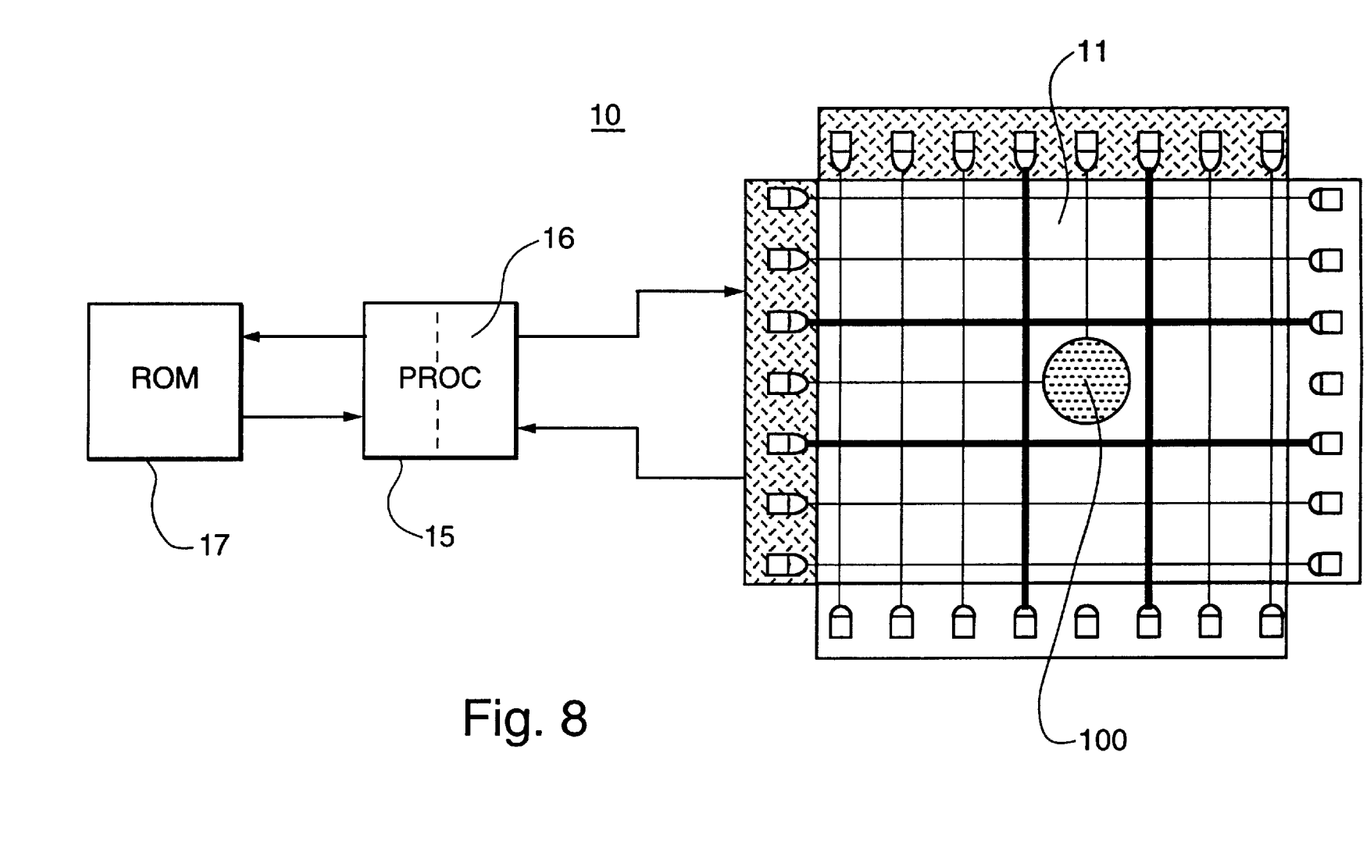
FIG. 8 is a schematic illustration of an embodiment of the present inventive touch system showing at least one processor communicating with a touch screen and preprogrammed read-only memory.

The selection of the transmitter-receiver pairs that have IR beams that intersect the coarse touch area 99 is dependent upon the optoelectronic device characteristics, including the transmitter and receiver aperture sensitivity, and the IR cone provided by the transmitter. For example, in one embodiment, the transmitter IR cone may be detectable by three receivers, and in another preferred embodiment using a different transmitter or receiver spacing, the transmitter IR cone may be detectable by five or more receivers. Given a specific touch system 10 and dimension for the touch screen 11, the transmitter IR cone characteristics and number of IR receivers reliably capable of detecting the IR cone are accordingly known and defined. As such, the detectable IR beams which may used in the fine scan may be predetermined for the specific touch system 10, for example as shown in one embodiment in FIG. 4 and FIG. 8. In one preferred embodiment, the predetermination of potential IR off-axis beams may be tabulated as a function of coarse on-axis grid location. The tabulated data may then be maintained in a processor read only memory ("ROM") 17 and accessed by the system processor 15 as a function of and after identifying the coarse on-axis touch location. In another preferred embodiment, the system processing may be separated into multiple processors 15 and 16, also shown in FIG. 8, for the separate tasks of controlling the activation of the transmitters and receivers as well as the table lookup and calculations of touch location.

The present inventive method provides increased resolution of touch location through use of on-axis and off-axis detection without the need for scanning every receiver for each transmitter. That is, the inventive method provides a first quick scan of the on-axis transmitter-receiver pairs, followed by activating and scanning selected transmitter-receiver pairs whose IR beams intersect the identified coarse touch area. In the FIG. 6 illustration and described preferred embodiment, the selected pairs are as follows: for transmitter 20(5), receivers 30(3), 30(4), 30(5), 30(6) and 30(7) are activated and detected; for transmitters 20(3) and 20(7), receiver 30(5) is activated; for transmitter 20(4), receivers 30(4), 30(5) and 30(6) are activated; and for transmitter 20(6), receivers 30(4), 30(5) and 30(6) are activated. These transmitter-receiver pairs have IR beams which cross through the coarse touch area 99. The remaining transmitter-receiver pairs are not activated or detected, thereby reducing the processing requirements for the second fine scan, and reducing the time period to determine accurately and with higher resolution the location of a touch 100. The y-axis transmitter-receiver pairs activated, for this FIG. 5 preferred embodiment, are similar to the above described pairs, selecting the particular pairs whose beams intersect the coarse touch area 99.

Figure 7:
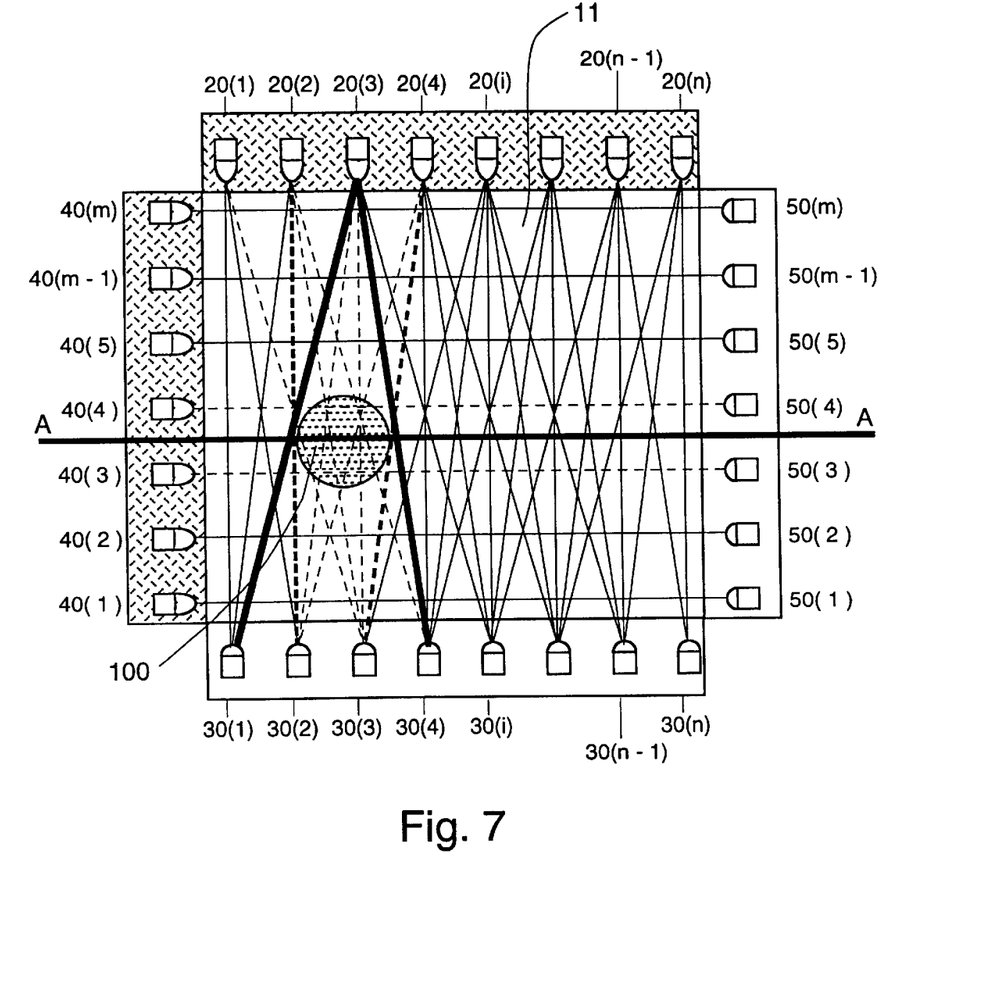
FIG. 7 is an overhead view of an illustration of the present inventive touch system method for improved resolution of touch location showing an example of the interdependence between the coarse y-coordinate touch position and the x-coordinates of the transmitter-receiver off-axis pairs to activate to refine the y-coordinate touch position.

Another preferred embodiment for the inventive method of determining the existence and location of a touch on an IR touch system uses an interdependence between the x or y coordinate of a touch and the alternate axis beams which may be used to refine the touch location. As shown in FIG. 7, a touch 100 has an x-axis coarse location between the x-axis transmitters 20(1) and 20(4) (being the last two detected on-axis beams), and a y-axis estimated center of touch 100 shown as line A—A. Both of these estimated touch locations were determined from a first coarse on-axis scan of the transmitters and opposing receivers. The calculation of the y-axis A—A line is, as described above, the average of the last detected on-axis IR beams. For the FIG. 7 example touch 100, y-coordinate transmitter-receiver pairs 40(2)–50(2) and 40(5)–50(5) are the last detected beams before the blocked beams between transmitter-receiver pairs 40(3)–50(3) and 40(4)–50(4).

As shown in FIG. 7, the determination of a refined x coordinate for touch 100 may be accomplished by activating particular x-axis transmitter-receiver pairs that cross between the last two detected on-axis beams (x-axis transmitters 20(1) and 20(4) as shown in the FIG. 7 example) in the area of the touch 100, and in particular that cross the coarse y-axis line A—A. The x-axis transmitter-receiver pairs that may be activated may be determined as a function of the y-axis coarse touch location. That is, the coarse y touch location may be used to select the alternate axis (x-axis) pairs to activate, and similarly, the coarse x touch location may be used to select the alternate axis (y-axis) pairs to activate. This interdependence results because the IR beams are simply lines. More specifically, the x coordinate of any portion of the beam may be easily calculated at any y coordinate from the slope (angle) of the beam and the x-intercept of the IR beam at the receiver. In equation form, $$x_i = x_0 + m * y_i$$

where $x_i$ is the x coordinate of a beam at $y_i$; m is the slope or angle of the IR beam; and $x_0$ is the x coordinate at the IR receiver. The slope, m, or angle of the IR beam between any transmitter-receiver pair may be easily calculated or determined because the position of each transmitter and receiver pair on the edge of the touch screen 11 is known for a given touch system 10, and as noted, the beams are simply lines connecting the transmitter and respective receiver.

Similar to the x-axis, the y coordinate of any portion of the beam may be easily calculated at any x coordinate from the slope (angle) of the beam and the y-intercept of the IR beam at the receiver, or in equation form, $$y_i = y_0 + m * x_i$$

where $y_i$ is the y coordinate of a beam at $x_i$; m is the slope or angle of the IR beam; and $y_0$ is the y coordinate at the IR receiver.

In view of this interdependence, and as illustrated in FIG. 7, given a y-axis coarse touch location, the alternate axis (x-axis) transmitter-receiver pairs that may activated and detected to refine the x-coordinate of the touch 100, and the calculation of a refined x-coordinate can, in a preferred embodiment, be determined as a function of the y-coordinate of line A—A. For the FIG. 7 example, a refined calculation of the touch x-coordinate coordinate may use the average of the last unbroken beams for transmitter-receiver pairs 20(3)–30(1) and 20(8)–30(4) at the estimated y-axis line A—A. The x-coordinates of beams 20(3)–30(1) and 20(8)–30(4) at line A—A may be calculated from the above x-axis equation. Similarly, a refined x-coordinate calculation may alternatively use the average of the last broken IR beams for IR optoelectronic pairs 20(2)–30(2) and 20(4)–30(3) at line A—A. In another preferred embodiment, a refined x-coordinate could be calculated as the average of the above described "last unbroken" average and "last broken" average.

Instead of using a floating point calculation, which may require a more complex processor 15, in another preferred embodiment, the x-coordinates of the known transmitter-receiver beams may be predetermined as a function of selected coarse y-axis positions or coordinates and stored as data tables as a function of coarse y-axis coordinates. As shown in the FIG. 8 schematic, the tabulated data may then be maintained in processor ROM 17 and accessed by the touch system processor 15 after identifying the coarse x-axis and y-axis touch locations.

While the described interdependence between the alternate axes, as shown in FIG. 7, focussed on the x-coordinate calculation, the y-axis could be similarly refined by using the y-axis transmitter-receiver pairs and IR beams generated across the touch screen 11.

Although the invention has been described with reference to exemplary embodiments, it is not limited thereto. For example, as noted, the calculation and determination of the alternate axis transmitter-receiver pairs may be accomplished by computation of the triangulation equations for given transmitter beam characteristics, or by a table lookup developed from precalculation of the equations.

Accordingly, it is intended to be and understood that the following claims should be construed to include other variants and embodiments of the invention which may be made by those skilled in the art as being within the true spirit and scope of the present invention.

What is claimed is:

1. An infrared touch system having increased resolution for determining position of a touch on a touch screen, said infrared touch system comprising:

a first plurality of infrared transmitters positioned along a first edge of the touch screen, each infrared transmitter of said first plurality of infrared transmitters controllably emitting a cone of infrared light;

a first plurality of infrared receivers positioned along a second edge of the touch screen directly opposite from the first plurality of transmitters, whereby each receiver of said first plurality of infrared receivers is aligned on-axis with one infrared transmitter of the first plurality of transmitters and is off-axis to each of the other first plurality of transmitters;

a second plurality of infrared transmitters positioned along a third edge of the touch screen, said third edge being approximately perpendicular to the first and second edge of the touch screen, each infrared transmitter of said second plurality of infrared transmitters controllably emitting a cone of infrared light;

a second plurality of infrared receivers positioned along a fourth edge of the touch screen opposite from the second plurality of transmitters, whereby each receiver of said second plurality of infrared receivers is aligned on-axis with one infrared transmitter of the second plurality of transmitters and is off-axis to each of the other second plurality of transmitters;

a processor to control activation of the first and second plurality of infrared transmitters and control activation of the first and second plurality of infrared receivers and for calculating the touch position on the touch screen using on-axis and off-axis activation of the infrared transmitters and receivers, wherein in calculating the touch position on the touch screen using on-axis and off-axis activation of the infrared transmitters and receivers, the processor (a) estimates a coarse touch location based upon a sequential on-axis activation of each infrared transmitter and opposing receiver;

(b) selects off-axis transmitter and receiver pairs based upon the coarse touch location estimate; and (c) refines the touch location based upon a sequential activation of the selected off-axis transmitter and receiver pairs.

2. An infrared touch system having increased resolution for determining position of a touch on a touch screen, said infrared touch system comprising:

a first plurality of infrared transmitters positioned along a first edge of the touch screen, each infrared transmitter of said first plurality of infrared transmitters controllably emitting a cone of infrared light;

a first plurality of infrared receivers positioned along a second edge of the touch screen directly opposite from the first plurality of transmitters, whereby each receiver of said first plurality of infrared receivers is aligned on-axis with one infrared transmitter of the first plurality of transmitters and is off-axis to each of the other first plurality of transmitters;

a second plurality of infrared transmitters positioned along a third edge of the touch screen, said third edge being approximately perpendicular to the first and second edge of the touch screen, each infrared transmitter of said second plurality of infrared transmitters controllably emitting a cone of infrared light;

a second plurality of infrared receivers positioned along a fourth edge of the touch screen opposite from the second plurality of transmitters, whereby each receiver of said second plurality of infrared receivers is aligned on-axis with one infrared transmitter of the second plurality of transmitters and is off-axis to each of the other second plurality of transmitters;

a processor to control activation of the first and second plurality of infrared transmitters and control activation of the first and second plurality of infrared receivers and for calculating the touch position on the touch screen using on-axis and off-axis activation of the infrared transmitters and receivers, wherein in calculating the touch position on the touch screen using on-axis and off-axis activation of the infrared transmitters and receivers, the processor (a) estimates a coarse x-coordinate and y-coordinate touch location on the touch screen based upon sequential on-axis activation of each infrared transmitter and opposing receiver;

(b) selects off-axis transmitter and receiver x-coordinate pairs based upon the coarse y-coordinate touch location estimate;

(c) refines the x-coordinate touch location based upon systematic activation of the selected off-axis transmitter and receiver x-coordinate pairs;

(d) selects off-axis transmitter and receiver y-coordinate pairs based upon the coarse x-coordinate touch location estimate; and (e) refines the y-coordinate touch location based upon systematic activation of the selected off-axis transmitter and receiver y-coordinate pairs.

3. An infrared touch system having a touch screen, said infrared touch system comprising:

a first plurality of infrared transmitters positioned along a first edge of a touch screen, each infrared transmitter of said first plurality of infrared transmitters controllably emitting infrared light;

a first plurality of infrared receivers positioned along a second edge of the touch screen opposite from the first plurality of transmitters, whereby each receiver of said first plurality of infrared receivers is aligned on-axis with one infrared transmitter of the first plurality of transmitters and is off-axis to each of the other first plurality of transmitters, further whereby an infrared beam of light emitted from each transmitter of the first plurality of infrared transmitters is receivable by at least two infrared receivers of the first plurality of infrared receivers;

a second plurality of infrared transmitters positioned along a third edge of the touch screen, each infrared transmitter of said second plurality of infrared transmitters controllably emitting infrared light;

a second plurality of infrared receivers positioned along a fourth edge of the touch screen opposite from the second plurality of transmitters, whereby each receiver of said second plurality of infrared receivers is aligned on-axis with one infrared transmitter of the second plurality of transmitters and is off-axis to each of the other second plurality of transmitters, further whereby an infrared beam of light emitted from each transmitter of the second plurality of infrared transmitters is receivable by at least two infrared receivers of the second plurality of infrared receivers;

a first processor to sequentially activate each of the first and second plurality of infrared transmitters and opposing first and second plurality of infrared receivers; and a second processor for calculating a touch position on the touch screen, wherein the second processor:

(a) identifies a coarse x-coordinate touch area based upon identification of blocked infrared beams between activated transmitters and receivers;

(b) identifies a coarse y-coordinate touch area based upon identification of blocked infrared beams between activated transmitters and receivers;

(c) calculates a coarse x-coordinate and y-coordinate touch area from the identified coarse x-coordinate and y-coordinate touch areas; and (d) refines the x-coordinate and y-coordinate touch location based upon systematic activation of off-axis transmitter and receiver pairs having infrared beams that cross the calculated coarse touch area.

4. A method of determining a touch location on a touch system screen, said screen having along first and second adjacent edges a plurality of infrared transmitters and said touch screen further having a plurality of infrared receivers along third and fourth adjacent edges opposing the plurality of infrared transmitters, such that each transmitter is aligned on-axis to one receiver, the method comprising the steps of:

estimating a coarse touch location based upon a systematic on-axis activation of each infrared transmitter and opposing receiver; and refining the touch location based upon a systematic off-axis activation of selected infrared transmitters and receivers.

5. The method of determining a touch location on a touch system screen, according to claim 4, wherein the systematic on-axis activation step is a sequential activation of each transmitter with its on-axis receiver.

6. The method of determining a touch location on a touch system screen, according to claim 4, herein the estimating step is based upon a systematic on-axis and a systematic off-axis activation of each infrared transmitter and receiver.

7. A method of determining a touch location on a touch system screen, said touch screen having along first and second adjacent edges a plurality of infrared transmitters and said touch screen further having a plurality of infrared receivers along third and fourth adjacent edges opposing the plurality of infrared transmitters, such that each transmitter is aligned on-axis to one receiver, the method comprising the steps of:

estimating a coarse touch location based upon a systematic on-axis activation of each infrared transmitter and opposing receiver;

selecting off-axis transmitter and receiver pairs based upon the coarse touch location estimate; and refining the touch location based upon a systematic activation of the selected off-axis transmitter and receiver pairs.

8. The method of determining a touch location on a touch system screen according to claim 7, wherein the step of systematic on-axis activation is a sequential activation of the infrared transmitters and on-axis receivers.

9. A method of determining a touch location on a touch system screen, said touch screen having along an x-coordinate edge, a first plurality of infrared x-coordinate transmitters and along a y-coordinate edge, a second plurality of y-coordinate infrared transmitters, said touch screen further having a plurality of infrared receivers along two edges opposing the plurality of infrared transmitters, such that each transmitter is aligned on-axis to one receiver, the method comprising the steps of:

(a) estimating a coarse x-coordinate and y-coordinate touch location on the touch screen based upon systematic on-axis activation of each infrared transmitter and opposing receiver;

(b) selecting off-axis transmitter and receiver x-coordinate pairs based upon the coarse y-coordinate touch location estimate;

(c) refining the x-coordinate touch location based upon systematic activation of the selected off-axis transmitter and receiver x-coordinate pairs;

(d) selecting off-axis transmitter and receiver y-coordinate pairs based upon the coarse x-coordinate touch location estimate; and (e) refining the y-coordinate touch location based upon systematic activation of the selected off-axis transmitter and receiver y-coordinate pairs.

10. The method of determining a touch location on a touch system screen according to claim 9, wherein the systematic on-axis activation in step (a) is sequential activation of adjacent transmitters and opposing receivers.

11. A method of determining a touch location on a touch system screen, said touch screen having along an x-coordinate edge, a first plurality of infrared x-coordinate transmitters and along a y-coordinate edge, a second plurality of y-coordinate infrared transmitters, said touch screen further having a plurality of infrared receivers along two edges opposing the plurality of infrared transmitters, such that each transmitter is aligned on-axis to one receiver, further wherein when activated, each infrared transmitter generates an infrared beam receivable by the on-axis receiver and at least one receiver adjacent to the on-axis receiver, the method comprising the steps of:

(a) sequentially activating each on-axis x-coordinate infrared transmitter and opposing receiver;

(b) identifying a coarse x-coordinate touch area based upon identification of blocked infrared beams between activated x-coordinate transmitters and receivers;

(c) sequentially activating each on-axis y-coordinate infrared transmitter and opposing receiver;

(d) identifying a coarse y-coordinate touch area based upon identification of blocked infrared beams between activated y-coordinate transmitters and receivers;

(e) calculating a coarse x-coordinate and y-coordinate touch area from the identified coarse x-coordinate and y-coordinate touch areas; and (f) refining the x-coordinate and y-coordinate touch location based upon systematic activation of off-axis transmitter and receiver pairs having infrared beams that cross the calculated coarse touch area.

* * * * *